Patented May 7, 1935

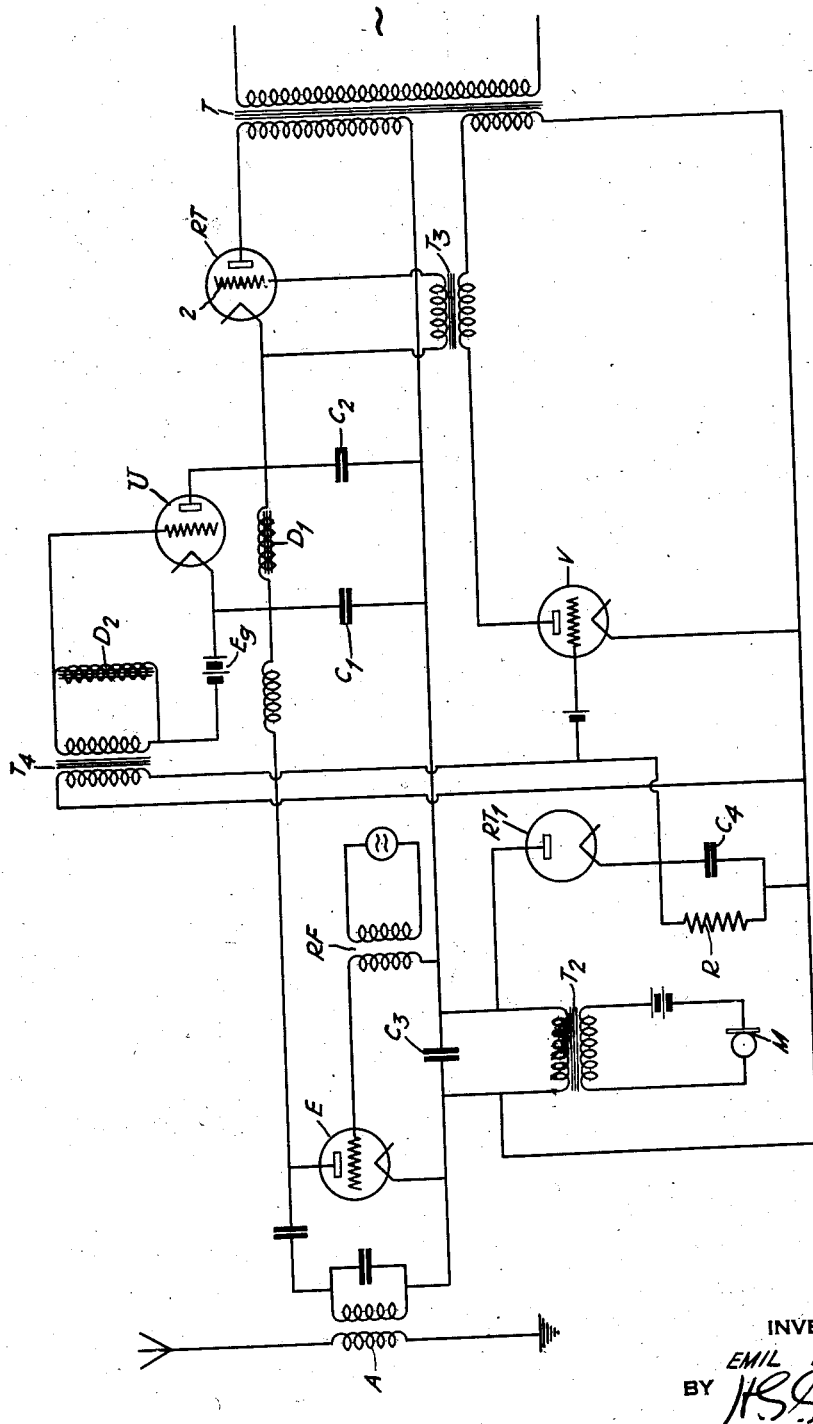

2,000,770

UNITED STATES PATENT OFFICE 2,000,770

MODULATION

Emil Mayer, Berlin, Germany, assignor to Telefunken Gesellschaft für Drahtlose Telegraphie m. b. H., Berlin, Germany, a corporation of Germany Application June 28, 1933, Serial No. 677,978
In Germany June 17, 1932

13 Claims. (Cl. 179—171)

This invention relates to an arrangement for modulated transmitters, and more in particular to telephonic transmitters.

Telephony transmitter systems have been known heretofore in which the value of the carrier wave is altered in accordance with the acoustic volume of the incoming voice or music in such a manner that a decrease in the mean modulation frequency amplitude is accomplished by a decrease in the amplitude of the carrier wave. This insures that the modulation percentage or factor of the waves sent out or broadcast is always approximately the same. This feature entails and insures a considerable saving in the cost of current, an item that assumes considerable practical importance, especially in the case of large power broadcast stations.

A change in the carrier wave amplitude is insurable by a variation of the grid biasing voltage or of the grid alternating voltage in the power or final stage of the transmitter. Another method known in the prior art and used for economy is to regulate the plate direct current voltage of the power stage of the transmitter. This latter scheme offers the practical merit that, as the amplitude of the modulation energy decreases, there occurs simultaneously also a reduction in the plate direct current voltage, so that both the energy absorption (input) of the power stage of the transmitter as well as the radio frequency energy output are varied, with the result that the highest current economy is secured. Where direct current generators are employed, certain practical difficulties will arise in changes of the plate voltage owing to the high inductance of the excitation of the generators. In arrangements in which the plate direct current voltage is produced by the aid of a rectifier from an alternating current line or supply, regulation of the ensuing plate voltage by the use of "stages" or rotary converters is unsuited.

According to this invention, the change in the direct current voltage in accordance with the mean amplitude of the modulation frequency is accomplished by energizing the transmitter stages from alternating current sources by way of rectifiers comprising tubes having control grid electrodes, the changes or variations in the plate potential available for the transmitter tube by action of energy derived from the modulating potentials upon the grid of the rectifiers. Within the scope of this invention, these latter tubes may be of the high vacuum type comprising a control electrode or else of any other vacuum tube type with a control electrode, say, gas or vapor filled rectifiers with a heated cathode and a control electrode as well. Moreover I contemplate the use of a well known rectifier tube in which, if the grid electrode is maintained negative beyond a critical value no anode current will flow, even though anode potentials are applied, but if the anode is maintained positive and the grid potential is reduced (made less negative) beyond said critical point, anode current will start flowing and will continue to flow as long as the anode is maintained positive. Also mercury vapor rectifiers with a control electrode which as a general rule consist of metal vacuum tubes made from iron and which are known as "iron rectifiers", are suited in connection with the present invention.

If the carrier wave is to be changed exclusively by alterations of the plate direct current voltage, then amplifier tubes with a very high gain-reciprocal should be employed therein, and the transmitter equipment may comprise a large number of modulated stages. For since the modulated tubes operate in the presence of "under voltage", in other words, since the amplitude of the alternating or changing voltage component superposed upon the plate direct current voltage is always very low as compared with the plate direct current voltage, it will be obvious that, in the case of tubes operating on a very low gain reciprocal, a variation of plate direct current voltage would result in no change at all in the radio frequency amplitude. It is only as a result of the gain reciprocal that the working point, in case of change of plate voltage of $\Delta E_a$, is shifted an amount of $\Delta E_a \cdot \alpha$, and this occasions a corresponding change in the radio frequency wave amplitude. Hence, the gain reciprocal $\alpha$ should be chosen large in order to secure an effective influence of the radio frequency current. Modulating the transmitter in a lower stage, and or acting upon the plate voltage of all of the modulated stages, where small values of $\alpha$ are dealt with, produces in the modulated stage or stages only a small change in the final radio frequency wave amplitude. However, in the amplifier which follows the modulator stages this effect is repeatedly reinforced because in each stage the working point is shifted with the direct current voltage, with an incidental alteration of the gain.

One difficulty of the modulation method as described resides in the fact that, upon a sudden increase in the volume or amplitude of the modulating potentials, the plate voltage is unable to grow with adequate rapidity owing to the presence in the circuits of choke coils and condensers usually provided to eliminate rectifier hum. In order to obviate this difficulty, overvoltage protection means are connected in parallel to the choke coils. These means may take the form of spark gaps or glow lamps, or glow discharge or gaseous conduction lamps. If with increasing sound volume the grid of the rectifier is based so that the plate voltage is rapidly increased, the said overvoltage protection means are rendered operative, with the result that the choke coil is bridged or shunted, and this in turn allows of a rapid charging up of the smoothing condensers. As soon as the condensers have been charged to their full potential, the overvoltage protection means are rendered inoperative, with the result that the choke coil in turn becomes operative again with to smooth out the ripples and to eliminate the hum. In lieu of protective devices such as gaseous conduction tubes or glow lamps, which as a general rule are suited only for small powers, and of spark gaps which are very delicate to adjust, I may employ a controlled hot cathode valve of the type described hereinbefore in which a current flow once started continues as long as the anode remains positive. A device of this kind is connected in parallel relation to the choke coils, and the same, in the presence of normal working voltages, is blocked for transmission or flow of current by the action of negative potential at the grid. If the voltage is to be raised suddenly, then, by the provision of suitable circuit means, a positive impulse is applied to the grid with the result that the charging of the smoothing condensers will be effected rapidly by way of the hot cathode tube rather than slowly by way of the choke coil. After the condenser becomes charged, the choke coil takes over the full current and the hot cathode tube is rendered inoperative.

The invention is exemplified by a practical embodiment shown in the drawing.

Referring to the latter, A denotes the antenna to which outgoing signal modulated oscillations are fed from the output circuit of the transmitter tube E. The radio frequency control oscillations are supplied to the tube E from a radio frequency source by way of a transformer RF. Direct current potential for the plate of the tube E is supplied from any power network or line connected with the primary winding of a transformer T the secondary winding of which is connected with a rectifier tube RT including a control grid 2. The output of the rectifier is connected to a filter circuit $D_1$, $C_1$, and $C_2$ which is in turn connected with the plate and cathode of tube E. The connection between the cathode of tube E and the negative terminal of the rectifier is by way of the secondary winding of a transformer $T_2$. This secondary winding is bridged or shunted by a condenser $C_3$ which passes carrier frequency waves but blocks out modulating potentials. The primary winding of the transformer $T_2$ is coupled with the microphone circuit M. There is further arranged in parallel to the secondary coil of the transformer $T_2$ a rectifier tube $RT_1$ connected in series with a blocking condenser $C_4$ which is shunted by a resistance R. Under the influence of the modulation currents, potential differences are set up across the condenser $C_4$, the value of which corresponds to the crest potential of the audio frequency currents. These potentials, on the one hand, are applied to the grid electrode of a control tube V which works within the curved portion of its characteristic. The plate supply for tube V is derived from a secondary winding on transformer T. The plate circuit of V also contains the primary winding of a transformer T3, the secondary of which is coupled with the grid 2 and the filament of the rectifier tube RT. In this manner, on the grid of the rectifier tube RT, which may be of the type in which a flow of current once started continues as long as the anode remains positive, there is impressed a biasing voltage which follows the mean value of the amplitude of the modulating potentials. This insures that the plate potential available at tube E varies in accordance with the mean amplitude of the modulating currents. To overcome the inertia of the filter circuit $D_1$, $C_1$, $C_2$, to changes in the current supplied from the rectifier RT the anode to cathode impedance of another hot cathode tube U is connected in parallel relation to the choke coil D. This tube U, under normal operating conditions, is blocked by a negative biasing voltage Eg. If, then, a rapid change in voltage arises across the condenser $C_4$, a change in the modulating potentials as rectified by $RT_1$, the same will be applied by way of the transformer T4 to the grid of the tube U to overcome the negative potential thereon so that will be conductive and be flashed or ignited as soon as the potential on the grid has built up to the proper value. Owing to the current flowing through the tube the inertia of the filter circuit which would prevent a rapid rise of the plate voltage, is obviated. The tube U will remain operative until the condenser C2 has been charged up to a point where no potential difference is acting across the choke coil D. In parallel relation to the secondary coil of the transformer T4 is disposed a choke coil D2, which is so dimensioned that a rapid change in voltage will reach the grid of tube U from the secondary of T4, whereas a slow change in voltage will be dissipated in $D_2$ and will not cause a fall of potential on the grid of U.

Having thus described my invention and the operation thereof, what I claim is:

1. Signalling means comprising, a source of high frequency oscillations, a thermionic repeater tube coupled by a circuit with said source, a source of modulating pontentials connected with said circuit between said source of high frequency oscillations and said repeater, a source of alternating current, a thermionic rectifier having its input electrodes connected with said source of alternating current, a filter circuit including an impedance connecting the output electrodes of said rectifier to the electrodes in said thermionic repeater, and a coupling including a second rectifier between said source of modulating potentials and a control electrode in said first named rectifier.

2. A device as claimed in claim 1 in which said filter circuit impedance is shunted by the output electrodes of a thermionic tube, the input electrodes of which are coupled to said modulation frequency source.

3. Transmitting means comprising, a source of high frequency oscillations, a thermionic tube having its input electrodes coupled to said source of high frequency oscillations and its output electrodes coupled to a work circuit, a source of modulating potentials, a circuit for coupling said source of modulating potentials to the input electrodes of said thermionic tube, a source of alternating current, a rectifier including a control grid having its input electrodes coupled to said source of alternating current, a filter circuit interposed between the output electrodes of said rectifier and the output electrodes of said thermionic tube, said filter circuit including series inductances and parallel capacities, a second rectifier having its input electrodes coupled to said source of modulating potentials and its output electrodes coupled to the control grid in said first named rectifier, and a discharge tube having its output electrodes connected in parallel with a portion of said filter circuit and its input electrodes coupled to said second named rectifier.

4. Signalling means comprising, a source of high frequency oscillations, thermionic amplifying means connected with said source of high frequency oscillations, a source of signal potentials connected with said thermionic amplifying means, a source of alternating current, a rectifier of the control electrode type connected with said source of alternating current, a circuit connected between the output of said rectifier and the output of said thermionic amplifying means, said amplifying means being energized by potentials from said rectifier to produce in said amplifier modulations of said high frequency oscillations by said signal potentials, and means for varying the amplitude of the carrier wave in accordance with the mean amplitude of the modulating potentials comprising, a circuit including a second rectifier connected between the source of modulating potentials and the control electrode in said first rectifier.

5. Transmitting means comprising, a source of high frequency oscillations, a thermionic tube having its input electrodes coupled to said source of high frequency oscillations, a source of modulating potentials, a circuit for coupling said source of modulating potentials to the input electrodes of said thermionic tube, a source of alternating current, a rectifier of the control grid type having its input electrodes coupled to said source of alternating current, a current smoothing circuit interposed between the output electrodes of said rectifier and the output electrodes of said thermionic tube, a second rectifier having its input electrodes coupled to said source of modulating potentials and a circuit coupling the output electrodes of said second rectifier to the control grid in said first named rectifier.

6. A system as recited in claim 5 in which said last named circuit includes an additional thermionic tube having a control grid and an anode, the control grid of said additional tube being connected to the output of said second named rectifier and the anode of said additional tube being connected to the control electrode in said first named rectifier.

7. A device as recited in claim 1 in which said filter circuit impedance is shunted by the output electrodes of a thermionic tube and in which the input electrodes of said last named thermionic tube are coupled by a circuit to the output electrodes of said second named rectifier.

8. A device as recited in claim 1 in which means is provided for impressing alternating current potentials from said alternating current source on the control electrode in said first named rectifier.

9. Transmitting means as recited in claim 5 in which said last named circuit includes an additional thermionic tube having a control grid and an anode, the control grid of said additional tube being connected to the output of said second named rectifier, the anode of said additional tube being coupled to the control electrode in said first named rectifier and in which said source of alternating current is also coupled to the control grid of said first named rectifier.

10. In a telephony signalling system, a thermionic tube having anode electrode, control grid electrode, and cathode electrode, a source of high frequency oscillations connected with the control grid electrode of said tube, a source of modulating potentials connected with the control grid of said tube, and means for maintaining a desired relation between the amplitude of the high frequency waves and of the modulating potentials to control the degree of modulation including a rectifier of the controllable type connected at its input to a source of alternating current and at its output to the anode and cathode electrodes of said tube to energize the same and a circuit energized by modulating potentials connected with said rectifier for controlling the rectifying action thereof.

11. Signal modulating means of the thermionic type comprising, a thermionic tube having anode, cathode and control grid, a source of carrier wave energy connected between the control grid and cathode, an output circuit connected between the anode and cathode, a source of modulating potentials coupled to a circuit connected between two of the electrodes of said tube to apply modulating potentials thereto, a source of alternating current, a rectifier having an anode, cathode and control grid, a circuit connecting the cathode and anode of said rectifier to said alternating current source and by way of a filter circuit to the anode of said first named tube, a second rectifier, a circuit coupling the input of said second rectifier to said source of modulating potentials, and a circuit connecting the output of said second named rectifier to the control grid of said first named rectifier.

12. A device as recited in claim 11 in which said named circuit includes a condenser which is charged by potentials from said modulating potential source and a resistance in parallel with said condenser from which the energy is supplied to the control grid of said rectifier.

13. A device as recited in claim 11 in which said last named circuit includes an additional rectifier connected by way of a parallel capacity and resistance to said modulating potential source and in which an additional thermionic tube has its control grid connected to a point on said resistance and its anode coupled to the control grid of said first named rectifier.

EMIL MAYER.

CERTIFICATE OF CORRECTION.

Patent No. 2,000,770.                                                        May 7, 1935.

EMIL MAYER.

It is hereby certified that error appears in the printed specification of the above numbered patent requiring correction as follows: Page 3, second column, line 50, claim 12, after "said" insert the word last; and that the said Letters Patent should be read with this correction therein that the same may conform to the record of the case in the Patent Office.

Signed and sealed this 29th day of June, A. D. 1937.

Henry Van Arsdale (Seal)                             Acting Commissioner of Patents.